UNITED STATES PATENT OFFICE.

GUSTAV GEHRING, OF LANDSHUT, BAVARIA, GERMANY.

PROCESS OF OVERLAYING OR DECORATING OBJECTS MADE OF METAL, GLASS, &c.

SPECIFICATION forming part of Letters Patent No. 310,042, dated December 30, 1884.

Application filed November 5, 1884. (No specimens.)

*To all whom it may concern:*

Be it known that I, GUSTAV GEHRING, a subject of the King of Bavaria, residing at Landshut, Germany, have invented new and useful Improvements in a Process to Overlay or to Decorate Objects of all Kinds Made from Metals, Glass, Porcelain, Clayware, Stone, &c., with Aluminium, of which the following is a specification.

According to this invention aluminium or aluminium-bronze, either in the shape of foil or as powder, is applied to the surfaces of metal, (whether plain or enameled,) glass of all kinds, porcelain, ceramic ware, pottery, faience, and natural or artificial stones, for the purposes of protection or ornamentation, either by the cold way or by burning or baking, such application being effected by the aid of certain substances, as I will now describe. Sebacitate of alumina or resinate of alumina—that is to say, alumina soap, either neutral or basic—is mixed with oil of lavender or other volatile oil and the aluminium or aluminium-bronze, the order in which the mixture is effected being optional. The alumina soap is prepared by forming a solution of either common soap or resin soap and precipitating by means of alum; or basic aluminium palmitate such as is used in soap manufacture may be used mixed with a suitable resin, such as copaiba resin. These alumina soaps are dissolved in volatile oils to form a thin lac, which is then incorporated with the aluminium or aluminium-bronze by rubbing upon glass, porcelain, or marble to the consistency of a thin sirup. This mixture is then applied to the metallic or other above-mentioned surfaces by means of a brush or feather, either so as to cover the whole surface or to produce any required designs thereon, for which purpose templets may be used; or the mixture may be applied to the surfaces by printing. The surfaces so treated are then exposed either to the open air or to heat, which may, under circumstances, be a red heat. For burning in the coating, either a Bunsen burner, a coal-fire, or hot-blast may be employed; or the treatment may be effected in muffles, annealing-furnaces, enameling-furnaces, and the like.

The above-described method is particularly applicable for providing steel and iron with a coating of aluminium in order to protect it from rust. This operation may be rendered more perfect by melting the above-described alumina-soap compound upon the iron or steel before the application of the aluminium coating. This coating can be polished in any known manner.

Instead of the above-described compound, may be employed in certain cases, a compound differing only therefrom in the admixture of a flux, the nature of which may be varied according to the nature of the article to be decorated. As the most suitable flux for most articles may be employed oxides of bismuth, (nitrate, or basic nitrate of bismuth-oxide,) either alone or in combination with borax, also the known fluxes for burning in metallic-oxide colors, such as borax, lead, quartz, and fluor-spar.

For articles that are already decorated with colors the flux used for the said colors is employed; or, if a high degree of heat is employed, the flux may be omitted, as by such heating the flux of the said color is softened to such a degree that the aluminium adheres thereto. The further treatment of the articles so coated with aluminium is the same as described with reference to the first compound. In either case both the aluminium coating, as also the parts of the surfaces adjoining the same, may be further decorated with precious metals and metallic-oxide colors.

Having now particularly described and ascertained the nature of my said invention and in what manner the same is to be performed, I declare that what I claim is—

1. The herein-described method of coating with aluminium or aluminium-bronze powder surfaces of metal, (either plain or enameled,) glass of all kinds, porcelain, ceramic ware, pottery, faience, and natural and artificial stones, by applying to such surfaces a mixture of alumina soap with volatile oils and aluminium or aluminium-bronze powder, either with or without the addition of a flux.

2. The production of articles of metal, glass, porcelain, ceramic ware, pottery, faience, and natural and artificial stones with a coating of aluminium or aluminium-bronze, applied thereto substantially as herein described, either with or without the additional ornamentation with other metals or colors.

In testimony whereof I have hereto set my hand in the presence of two witnesses.

GUSTAV GEHRING.

Witnesses:
JOS. W. HARPER,
EMIL HENZEL.